Figure 1:
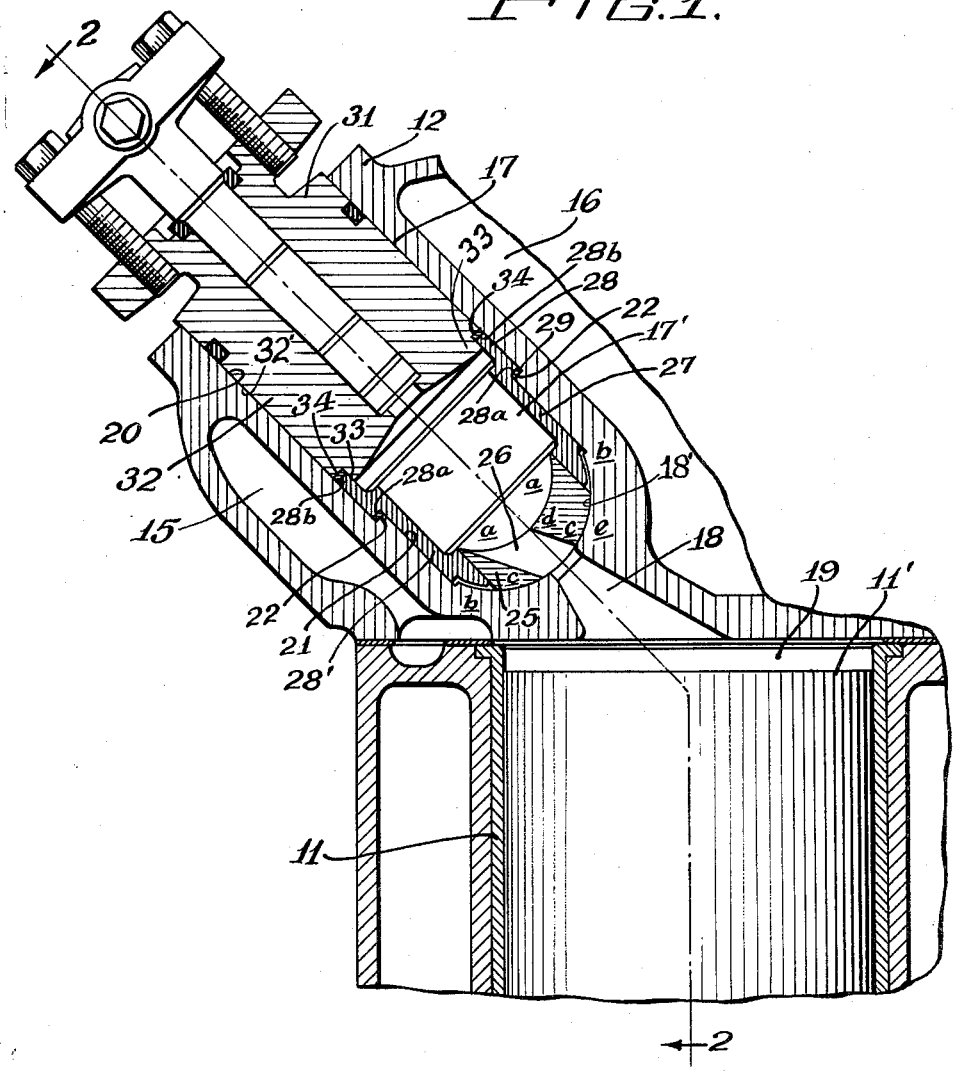

Dec. 26, 1961 T. M. DRESSLER 3,014,465
PRECOMBUSTION CHAMBER FOR INTERNAL COMBUSTION ENGINES
Filed July 13, 1959 2 Sheets-Sheet 2
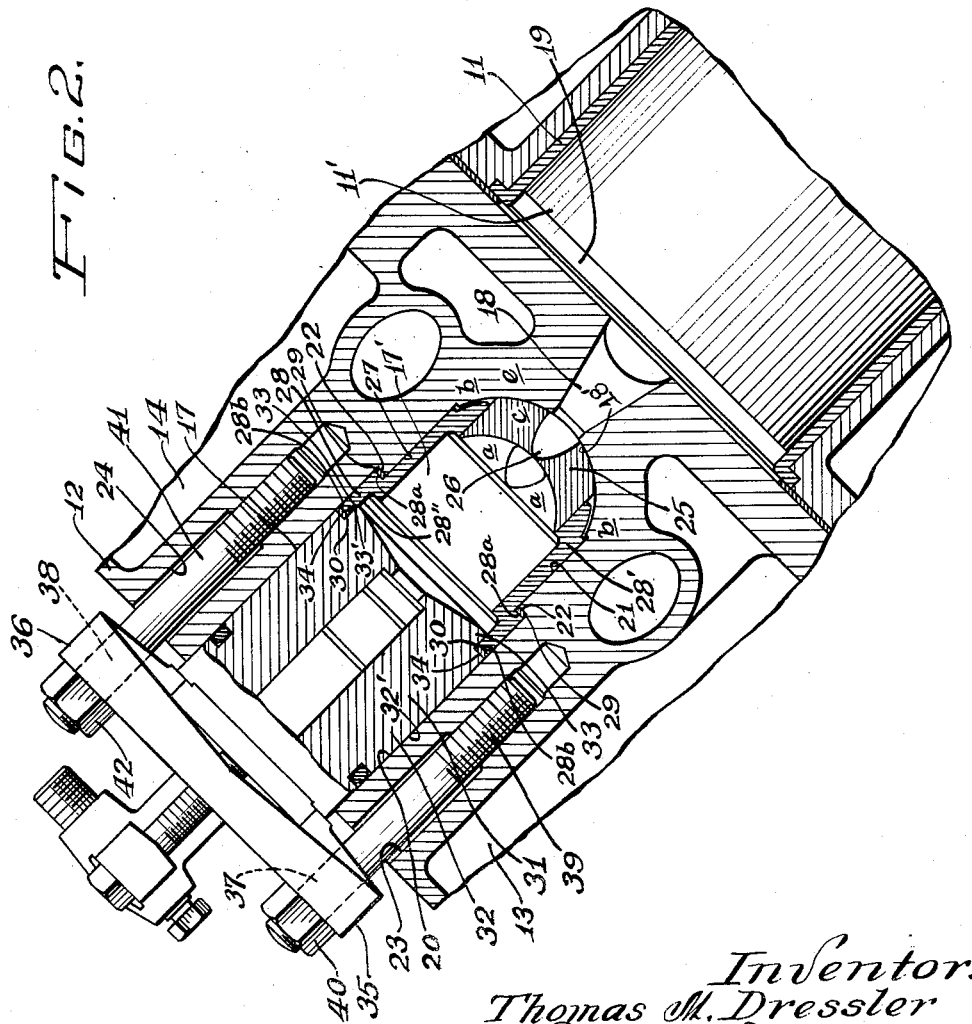
Inventor:
Thomas M. Dressler
Paul O. Pippel
Atty.

United States Patent Office 3,014,465
Patented Dec. 26, 1961

3,014,465
PRECOMBUSTION CHAMBER FOR INTERNAL COMBUSTION ENGINES
Thomas M. Dressler, Chicago, Ill., assignor to International Harvester Company, Chicago, Ill., a corporation of New Jersey
Filed July 13, 1959, Ser. No. 826,534
10 Claims. (Cl. 123—32)

This invention relates to diesel engines and is primarily concerned with a precombustion chamber for diesel engines.

In the past it has been the practice to use a precombustion chamber cup having a cylindrical side wall and a bottom wall with a convex outer surface intended to be placed over a mated concave bottom surface of a recess in the cylinder head of a diesel engine, the exterior sides of the cup abutting the interior vertical circular walls of the recess, and the interior of the cup forming the precombustion chamber for receiving discharged fuel from the injection nozzle seated atop the cup for transference through the cup and a passage communicating through the recess bottom with the interior of the combustion cylinder. The vertical circular side wall of the cup had at its upper end a first ledge surface to support the cylindrical nozzle body and had at its lower end a second ledge at the juncture of the vertical side with the convex bottom portion of the cup to seat upon an associated ledge formed at the juncture of the interior vertical surfaces of the cylinder recess concave surface of the recess. A first sealing means was placed on the first ledge and second sealing means was placed on the second ledge to prevent escape of gases from the combustion chamber into the space between the cup and the recess and between the nozzle body and the recess.

Under this arrangement the second ledge was acting as a clamping area too close to the heated combustion chamber and stresses develop in the area due to clamping presses being applied in a hot zone. Furthermore, the distance between the two ledges was great enough to increase the possibility of buckling of the cup wall between the ledges. Further, because of the integral construction of the convex bottom wall and the vertical wall of the precombustion chamber cup, seating of the cup flush against the vertical wall and convex bottom wall of the recess was practically impossible even with precision machining. This caused an air space between the cup and the bottom wall of the cylinder head which space hampered the conduction of heat from the cup to cylinder head for absorption in a water jacket in the cylinder head wall and resulted in burning of the area of the metal cup at its bottom where the passage leads from the precombustion chamber into the interior of the cylinder.

It is therefore an object of this invention to provide a precombustion chamber for diesel engines having a throat insert therein in contact with the cylinder head so that the insert is kept cooler than cup designs heretofore used thereby eliminating burning of the material around the passage through the insert.

Another object of the invention is to provide a precombustion chamber for diesel engines having a precup sleeve therein which is clamped in a cooler area and over a lesser length than cup designs heretofore used, thereby eliminating buckling of the sleeve wall.

A further object of the invention is to provide a precombustion chamber for diesel engines having a sleeve therein in which the clamping ledge in the recess in the cylinder head is brought farther away from the area between the recess and the compression space in the cylinder than in precombustion chambers heretofore used thereby reducing the possibility of the cylinder head cracking due to clamping of the sleeve.

A still further object of the invention is to provide a two piece precombustion chamber in place of the integral insert and sleeve cup design and comprising a precup throat insert and precup sleeve wherein the insert member is press fitted within the sleeve for abutting relation with the bottom of the cylinder head thereby removing the clamping pressure from the bottom of the precup bore or recess of the cylinder head so as to reduce the possibility of cylinder head cracking.

A still further object is to provide a throat insert for a precombustion chamber which may be of different material than an associated precup sleeve.

The foregoing and other objects of the invention will be apparent from the construction and arrangement illustrated in the accompanying drawings wherein:

FIGURE 1 is a longitudinal sectional view through the cylinder head of a diesel engine, and FIGURE 2 is a longitudinal sectional view through the cylinder head taken approximately on the line 2—2 of FIGURE 1.

Describing the invention in detail and having particular reference to the drawings there is shown a cylinder 11 of a diesel engine with a piston 11' therein and having adjacent it a cylinder head 12 provided with water passages 13, 14, 15 and 16. The cylinder head 12 has a bore or recess 17 therein, the lower part of which forms the precombustion chamber or pre-cup 17', and a passage 18 extending from the bowl shaped bottom 18' of the precombustion chamber 17' into the compression space 19 of the engine. The recess or cavity 17 is circular in cross section and has a first section 20 of one diameter and a second section 21 of a smaller diameter forming an inwardly directed shoulder or ledge 22 between the sections. The cylinder head 12 has a pair of internally threaded bolt receiving bores 23 and 24 disposed on opposite sides of the recess 17.

A hollow bowl shaped member or bottom wall or precup insert 25 is disposed in the precombustion chamber 17' against the bottom thereof and has a passage 26 extending therethrough communicating the precombustion chamber 17' with the passage 18. A cylindrically shaped precup sleeve or chamber side wall 27 has an upper part or collar 28 of larger diameter and smaller length that abuts against the periphery surface of the section 20 and has a lower part 28' of smaller diameter and greater length that is disposed over and around the separate throat insert or bottom wall 25 in a tight press fit. A gasket 29 is disposed between the ledge 22 of the cylinder head and the bottom edge 28a of the part 28 and a sealing means or gasket 30 is disposed against the top edge 28b of the wall 28. The sealing means 29 and 30 prevent the escape of hot gases from the cylinder 19.

A fuel injection nozzle 31 having a first section 32 of greater length and diameter and a second section 33 of lesser length and diameter so as to form a ledge 34 between the sections 32, 33, is so disposed within the section 20 of the recess 17 that the first section 32 has its outer periphery 32' abutting the periphery of section 20 and the second section 33 has its outer periphery 33' abutting an inner periphery 28" of the part 28, and the ledge 34 seats against the gasket 30.

A pair of extensions 35 and 36 are integral with the outer end of the fuel injection nozzle 31 and the extension 35 has a hole 37 therein and the extension 36 has a hole 38 therein. A shank or stud 39 extending through the hole 37 in extension 35 has external threads in threaded engagement with the threads in the bore 23 in the cylinder head and a nut 40 is threaded on external threads on the shank 39. A shank or stud 41 extending through the hole 38 in extension 36 has external threads in threaded engagement with the threads in the bore 24 in the cylinder head and a nut 42 is threaded on external threads on the shank 42.

In assembling the two piece precup sleeve 27 and insert 25 in the precombustion chamber 17', the insert 25 is press fitted into the lower portion of the sleeve 27 so that the bottom of the insert 25 extends slightly beyond the bottom of the sleeve 27 and then the sleeve 27 with its insert 25 is placed in the precup chamber 17 of the support structure or cylinder head 12 so that the bottom of the insert 25 rests against the bottom of the recess 17 of the support 12, the bottom of the sleeve 27 not quite touching the bottom of the recess 17. Next the injection nozzle 31 is inserted into the recess 17 over the sleeve 27 and the extensions 35, 36 are placed on top of the nozzle 31. The studs 39, 41 are passed through holes 37, 38 and threaded into bores 23, 24. Nuts 40, 42 are threaded on the studs 39, 41 so as to press the extensions 35, 36 against the nozzle 31 which forces the sleeve 27 against ledge 22 in the recess 17 and against the bottom of the recess and also seats the insert 25 flush against the bowl shaped bottom of the recess 17. Since the bottom of the insert 25 when originally placed in the recess 17 with the sleeve 27 is projected beyond the bottom of the sleeve, upward displacement or sliding movement of the insert 25 with respect to the sleeve 27 can occur when tightening the nuts 40, 42 against the extension 35, 36. This obtains good contact between the bottom of the recess 17 and the bottom of the insert 25, yet the insert 25 being tightly fitted in the sleeve 27, prevents any further movement of the insert 25 when tightening of the bolts 40, 42 is completed.

The area of clamping of the insert 17 between the ledges 22 and 34 is of lesser extent and farther removed from the hot area "a" of combustion than in precup insert designs heretofore used wherein the clamping area extended from the ledge 34 to about the point b shown in the drawings. Since the clamping area is smaller the possibility of side wall 27 between the clamping surfaces buckling is greatly diminished if not entirely eliminated and since the clamping area of the side wall 27 as well as the clamping surface or ledge 34 is farther removed from the hot zone "a" any clamping stresses developed are located in a cooler area and the danger of cylinder head cracking is greatly reduced.

Heretofore in the integral one piece insert and sleeve, cup design, the concave contour of the sleeve bottom and the extent of its clamping surfaces had to be very accurately machined to have it mate closely with corresponding equally accurately machined surfaces of the recess in order to prevent any air gap between the bottom of the sleeve and the bottom of the recess in the area "c." If such an air gap existed, and it usually did even with the finest machining of parts, the heat developed in the area "a" and transferred to the sleeve bottom could not be quickly conducted to the cylinder head in area "e" because of the heat insulating effects of the air gap and this resulted in burning of the material of the insert in the area "d." The use of the two piece precup sleeve 27 and throat insert 25 permitting flush contact of the insert 25 with the bottom of the recess 17 allows the heat to be conducted quickly from the insert 25 to the cylinder head 12 in the area "c" and thence to the water jackets and thus burning of the insert is eliminated.

Furthermore, since the insert and sleeve are separate, the insert can be made of a different material than the sleeve which material may be more heat resistant than the material of the sleeve.

What is claimed is:

1. In a precombustion chamber structure for an internal combustion engine having a cylinder and a cylinder head having a recess and a bottom for the recess with a passage communicating with the cylinder, the combination of a chamber sleeve in the recess, said sleeve having an axial bore, a bottom member in said bore tightly pressed into one end of the sleeve and having a port communicating between said passage and said bore, a nozzle structure in the recess closing and abutting the opposite end of the sleeve, retaining means reacting between the cylinder head and the nozzle structure for advancing the nozzle structure into the recess against the sleeve and urging the latter into the recess and said bottom member against said recess bottom, said bottom member having a tight creep accommodating sliding fit within the sleeve and projecting therefrom toward and into engagement with the bottom of the recess, and means limiting advancement of the sleeve into the recess subsequent to the contacting of the bottom member with the recess bottom as aforesaid.

2. The invention according to claim 1 and said bottom member and said bottom of the recess being complementally concavo-convex engaging and said nozzle structure oriented to provide a concentrated hot point zone about the bottom member approximate said port.

3. In an internal combustion engine, a heat transfer structure having a cavity and a bottom with a fluid passage therein, a precombustion chamber assembly including a pair of telescoping elements in the cavity, one of said elements engaging said bottom and having an aperture communicating with the passage, said one element having a tight slip fit with the other and movable axially with respect to the other as said assembly is urged into the cavity while maintaining intimate thermal contact with said bottom.

4. In an internal combustion engine, a heat transfer structure having a cavity of predetermined axial dimension and having a closing bottom, a pre-combustion assembly comprising a pair of axially telescoping heat resistant lining members having an initial length greater than said predetermined length, and means for urging said members into said cavity with one member abutting said bottom and telescoping the assembly into the cavity, said one member movable with respect to the other in the abutting position of said one member with the bottom of the cavity.

5. A precombustion chamber construction for an internal combustion engine comprising a heat transfer structure including a cavity, a multipart precombustion chamber member therein including a first part having complementary surface engagement with said heat transfer structure in thermal transfer relation therewith and including a fluid passage for communication with an associated cylinder and having a localized area of high heat formation approximate said passage, a second part snuggly fitting in the cavity axially limited and having peripheral press-fitted confining relation to said first part and having an outer end portion with an outwardly directed collar, a nozzle structure extending into said second part and abuttable with said collar, an inwardly directed shoulder on the heat transfer structure beneath the collar, retaining means associated with said nozzle structure for urging said nozzle structure into the cavity and engaging it with said collar for engagement with said inturned shoulder on said heat transfer structure and urging said first part into intimate engagement with said heat transfer structure.

6. A pre-combustion chamber construction for an engine comprising an element providing a heat transfer structure including a cavity, a multipart chamber member therein comprising a first part having surface engagement with said heat transfer structure in thermal transfer relation therewith and including a fluid passage for communication with an associated cylinder and having a hot point area approximate said passage, a second part provided with a ledge and reposed within said cavity and having peripheral confining relation to said first part, a nozzle structure abuttable with said ledge, a shoulder on the heat transfer structure, retaining means associated with said nozzle structure for urging said nozzle structure into the cavity and engaging it with the ledge to move said second part against said shoulder and urging said first part into engagement with said heat transfer structure.

7. In an internal combustion engine comprising a cylinder and a cylinder head having a recess and a bottom for the recess with a passage extending into the cylinder, an insert disposed in and bearing against said bottom and over-lapping the bottom axially of the recess and in intimate contact with the bottom along a surface extending transaxially of the recess and provided with a port therethrough communicating the recess with the passage, a sleeve disposed in the recess in the cylinder head in telescoping contact with the insert, and a fuel injection nozzle structure disposed in the recess against the sleeve and secured to the cylinder head for advancement of the sleeve and insert into the recess attendant to holding the insert against said bottom as aforesaid and said insert being movable with respect to the sleeve attendant to holding the insert against said bottom.

8. In an internal combustion engine comprising a cylinder and a cylinder head having a recess with a first section of one diameter and a second section of a smaller diameter forming a ledge between the sections and a bottom for the recess with a passage extending into the cylinder, an insert disposed in the recess against said bottom and provided with a port communicating the recess with the passage, a sleeve within the recess and having an insert portion in telescopic contact with the insert and having an outurned flange portion having sealing surfaces, a first sealing means disposed between the ledge and one surface of the flange portion, a fuel injection nozzle structure within the recess and having a pair of sections of different diameters forming a shoulder between the sections, a second sealing means disposed between the shoulder and another surface of the flange portion, and means advancing the fuel injection nozzle against the second sealing means and the flange portion against the first sealing means for registering the insert in flush contact with the bottom of the recess and securing the fuel injection nozzle to the cylinder head.

9. The invention according to claim 1 wherein said retaining means comprises a plurality of extensions on said nozzle structures, each extension having an aperture, said cylinder head having complimentary bores for registry with the apertures in the extensions, and fastening means receivable in the apertures and bores to advance the nozzle structure against the sleeve.

10. In a precombustion chamber structure for an internal combustion engine the combination of a heat resistant liner having axially telescoping sleeve and insert portions, an enveloping heat transferring structure having a surface in intimate contact with one end of said insert and with the periphery of the sleeve whereby said sleeve is movable axially with respect to the associated surface portion on the heat transferring structure, the area of contact between said surface and said one end of the insert extending transaxially, said liner having an expanded preassembly position with respect to said heat transferring structure and a contracted assemblied position with respect to said heat transferring structure with attendant movement of the sleeve into said heat transferring structure and with said insert forcibly and tightly engaged with the companion surface portion on the heat transferring structure, said insert having a tight slip fit with the sleeve and movable with respect to the sleeve while maintaining intimate thermal contact of the insert with the companion surface portion of the heat transferring surface.

References Cited in the file of this patent
UNITED STATES PATENTS 2,769,434    Witzky _____ Nov. 6, 1956

FOREIGN PATENTS 499,573    Italy _____ Nov. 13, 1954
531,572    Italy _____ Aug. 3, 1955